United States Patent

Maeda et al.

[11] 4,447,010
[45] May 8, 1984

[54] PROPORTIONAL REGULATION OIL BURNER OF LOW PRESSURE AIR TYPE

[75] Inventors: Yasunori Maeda, Nara; Akinobu Yamasaki, Yamatokoriyama, both of Japan

[73] Assignee: Chugai Ro Co., Ltd., Osaka, Japan

[21] Appl. No.: 352,583

[22] Filed: Feb. 26, 1982

[51] Int. Cl.³ .............................................. F23D 13/38
[52] U.S. Cl. .................................. 239/414; 239/416.1; 239/417; 239/428; 239/401
[58] Field of Search ............... 239/401, 414, 416, 417, 239/422, 416.1, 428

[56] References Cited

U.S. PATENT DOCUMENTS

| 1,567,482 | 12/1925 | Anthony | 239/428 |
| 2,290,785 | 7/1942 | Turpin | 239/414 |
| 2,863,500 | 12/1958 | Schumann | 239/416 |

Primary Examiner—Carroll B. Dority, Jr.
Attorney, Agent, or Firm—Birch, Stewart, Kolasch & Birch

[57] ABSTRACT

A proportional regulation oil burner of low-pressure air type, wherein a second separate air nozzle is disposed between the oil nozzle and the first air nozzle, and a small amount of low-temperature air is fed into the second air nozzle to prevent the oil nozzle from becoming higher in temperature, whereby heavy oil can be used even when the preheating air of high temperature is used.

4 Claims, 4 Drawing Figures

PROPORTIONAL REGULATION OIL BURNER OF LOW PRESSURE AIR TYPE

BACKGROUND OF THE INVENTION

1. Field of the Invention

The present invention relates to a proportional regulation oil burner of low-pressure air type and, more particularly to improvements in a proportional regulation oil burner of low-pressure air type, which operatively cooperates with a regulating mechanism for feeding an oil amount to vary the opening area of the burner tip end thereby to vary the combustion air amount, and is adapted to atomize the oil such as heavy oil with the combustion air of high temperature.

2. Description of the Prior Art

Conventionally, in the proportional regulation oil burner of low-pressure air type, as shown in FIG. 1, an oil nozzle 4 was disposed at the central portion of the burner body 1, an air nozzle 7 was located on the outer periphery, the oil feed amount from an oil feed opening 6 was regulated through the rotation of a handle 10 to advance or retreat the air nozzle 7 through the operative cooperation therewith, one portion of the air from the combustion air entrance 2 was jetted from the opening portion a through a hole 8 to atomize the oil from the oil nozzle 4. The combusting operation was effected with the combustion air from the opening portion b composed of the air nozzle 7 and the burner external pipe 3.

In the oil burner of said type, when the high-temperature preheating air of 350° C. was used as the combustion air, the oil nozzle 4 was heated. The oil was carbonized on the inner wall of the oil nozzle 4 particularly during the low flow of the oil or during the cut off thereby to perform blocking. The oil, which was adhered on the inner face of the externally expanded conical opening portion 5 of the oil nozzle 4 or on the inner face of the tip end portion 9 of the air nozzle 7, was carbonized and the carbonized oil grows to lose the normal nozzle function. This fact was considerable particularly when heavy oil was used as the fuel.

Therefore, the oil burner of conventional type had a disadvantage in that the heavy oil could not be used when the preheating air of temperature higher than a given temperature was used.

SUMMARY OF THE INVENTION

Accordingly, an object of the present invention is to provide a proportional regulation oil burner of low-pressure air type, which is free from the disadvantages of the conventional proportional regulation oil burner of low-pressure air type.

Another object of the present invention is to provide a proportional regulation oil burner of low-pressure air type, wherein high-temperature preheating air is used as combustion air and heavy, inexpensive oil can be used without causing any blocking in the oil nozzle by means of oil carbonized material.

The other object of the present invention is to provide a proportional regulation oil burner of low-pressure air type which is simple in construction, easy in assembly and accurate in operation.

According to the present invention, there is provide a proportional regulation oil burner, of low-pressure air type, which operatively cooperates with a regulating mechanism for feeding an amount of oil to vary the opening area of the burner tip end thereby to vary the amount of the combustion air to be adapted to atomize the oil, comprising an oil nozzle for oil disposed in the center, a second air nozzle for second air of low temperature, a first air nozzle for first air of high temperature and a burner external pipe constituting a burner body, each of which three latters is concentrically disposed around the external periphery of the oil nozzle, in sequence order, respectively, the opening area of first air nozzle being adapted to be varied through the advance or retreat of the first air nozzle.

Briefly described, in the proportional regulation oil burner of low-pressure air type of the present invention, a second separate air nozzle is disposed between the oil nozzle and the first air nozzle, and a small amount of low-temperature air is fed into the second air nozzle to prevent the oil nozzle from becoming higher in temperature. Also, the second air nozzle tip end portion is provided to be located before the first air nozzle tip end portion to prevent the oil from adhering on the inner face of the first air nozzle tip end portion. Thus, heavy oil can be used even when the preheating air of high temperature is used.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
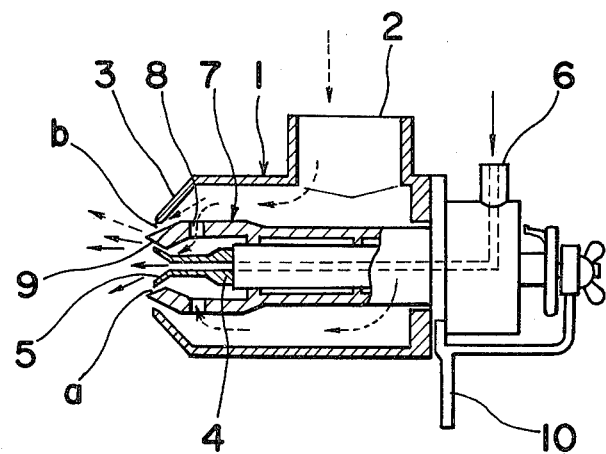
FIG. 1 is a cross-sectional view of the conventional proportional regulation oil burner of the low-pressure air type as referred above.
Figure 2:
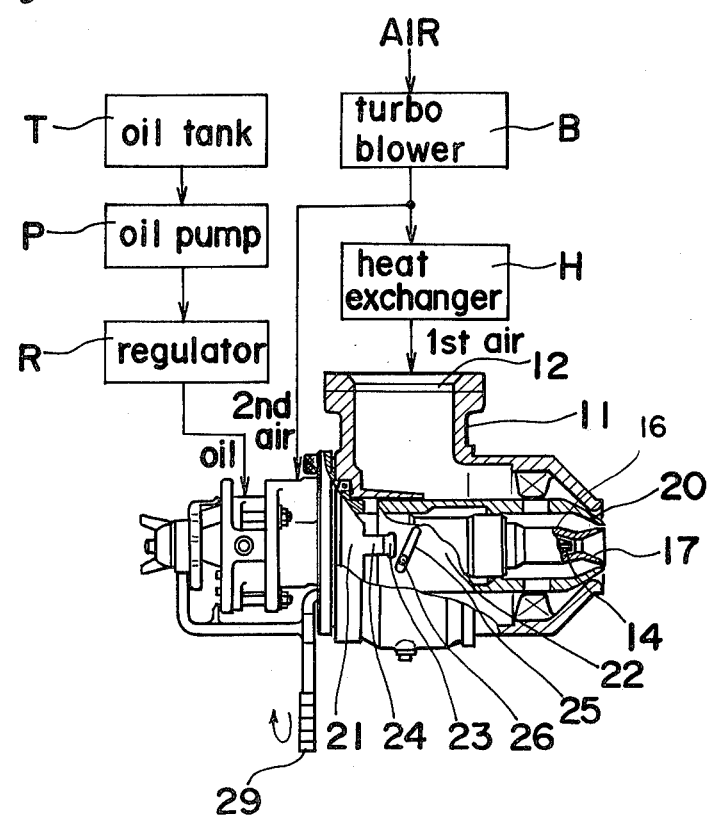
FIG. 2 is a side-elevational view, partially broken away, of a proportional regulation oil burner of a low-pressure air type in accordance with the present invention.
Figure 3:
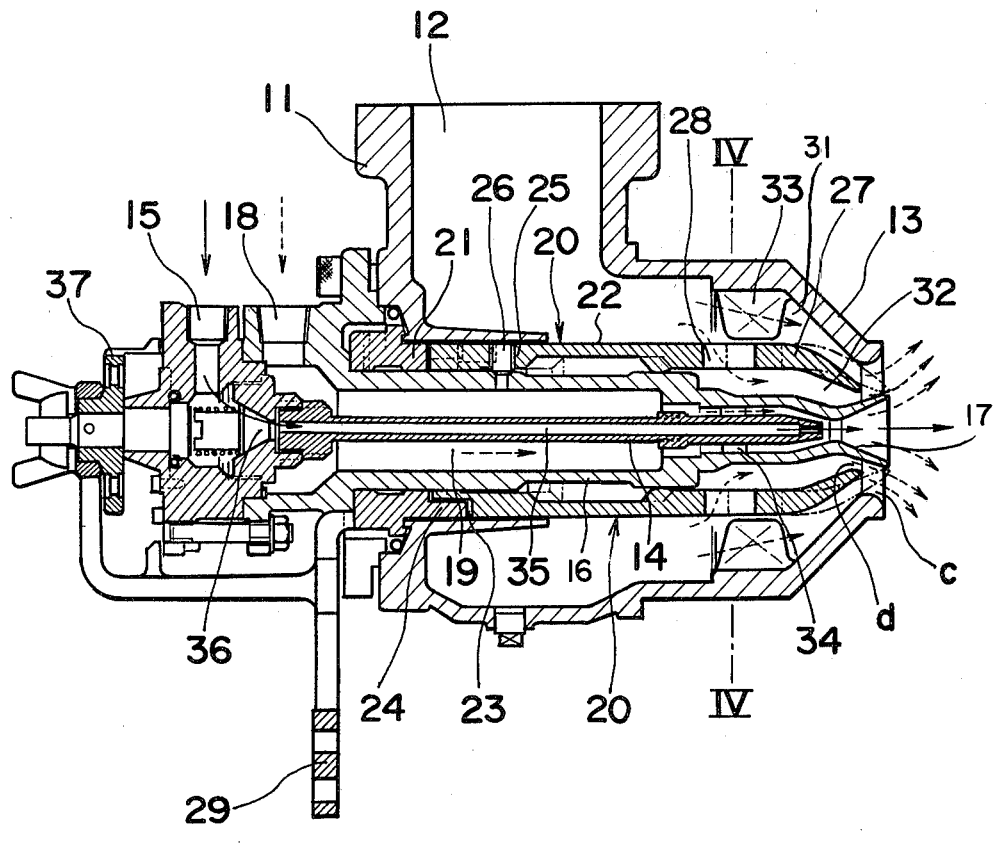
FIG. 3 is a cross-sectional view, on an enlarged scale, of the oil burner of FIG. 2.
Figure 4:
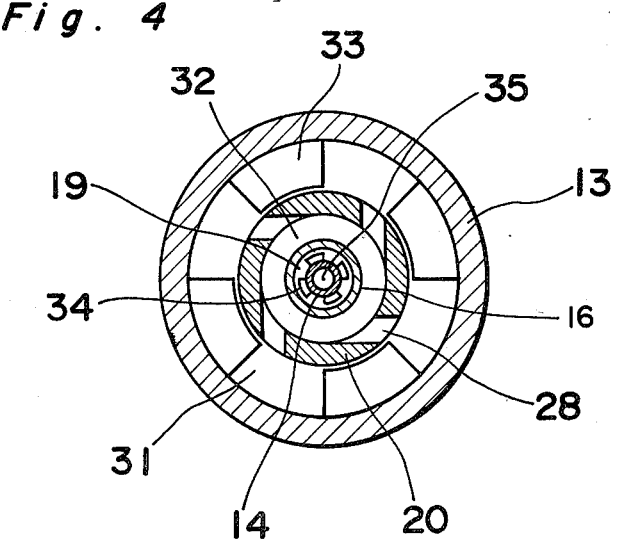
FIG. 4 is a cross-sectional view of the oil burner taken along the line IV—IV of FIG. 3.

Referring to FIG. 2, according to one preferred embodiment of the present invention, there is shown a proportional regulation oil burner of low-pressure air type, which operatively cooperates with a regulating mechanism for feeding an amount of oil to vary the opening area of the burner tip end, which comprises an oil nozzle 14 disposed in the center, a second air nozzle 16 provided around the oil nozzle 14, a first air nozzle 20 provided around the second air nozzle 16 and a burner external pipe 13 provided around the first air nozzle 20, all of which each opening area being adapted to be varied through the advance or retreat of the first air nozzle 20 as described below. The oil nozzle 14 for supplying oil fuel from an oil source (not shown) including an oil tank T, oil pump P and regulator R is disposed in the center of a burner body 11 including the burner external pipe 13. The second air nozzle 16 which is provided, at its tip end portion, to be located before the first air nozzle tip end portion, with an outwardly expanded conical opening portion 17 is disposed at a given space on the outer periphery of the oil nozzle 14 thereby to form therebetween a feed passage for cooling air 19 to be supplied as a second air from a turbo blower B.

The first air nozzle 20 for supplying a first air from the turbo blower B through a heat exchanger H is engaged with the outer periphery of the second air nozzle 16 while providing therebetween a given space constituting a second passage 32 for first air. The tip end portion 27 of the first air nozzle 20 faces an opening of the burner body 11 while providing therebetween a given space constituting a first passage 31 for first air. The opening of the burner body 11 is formed by the tip end portion of the burner external pipe 13 and the conical opening portion 17 of second air nozzle 16, and advances of retreats to vary the opening area of the opening portions c, d formed by the first air nozzle 20, second air nozzle 16 and burner external pipe 13. The first air nozzle 20 is composed of a tip end nozzle portion 22 and a base end rotary portion 21, both provided rotatably around the outer periphery of the second air nozzle 16 while providing the tip end nozzle 22 slidably along the axial direction of the second air nozzle 16 for free advancing or retreating to vary the opening area of the opening portions c, d. The base end rotary portion 21 is fixedly connected with an operating knob 29 to rotate together around the second air nozzle 16 and is provided at its inner end with a convex 24 projecting to engage with a concave 23 provided on the tip end nozzle portion 22 to rotate together but to slidably move the tip end nozzle portion 22 along the axial direction of the second air nozzle 16 under the guidance of an engagement between a guide pin 26 and a screw guide groove 25 provided in the tip end nozzle portion 22. The guide pin 26, which is mounted on the second air nozzle 16, is located in the screw guide groove 25 of the tip end nozzle portion 22 to slidably move along the periphery of the screw guide groove 25. Accordingly, when the base end rotary portion 21 rotates by the rotation of the operating knob 29, the tip end nozzle portion 22 follows to rotate through the engagement of the convex 24 and concave 23, but the tip end nozzle portion 22 advances or retreats rotating along the axial direction of the second air nozzle 16, due to the existence of the engagement of the guide pin 26 and screw guide groove 25 to vary the opening area of the opening portions c, d thereby to vary the feed amount of the combustion air to be supplied from each of the opening portions c, d. A hole 28 feeds the combustion air.

The tip end nozzle portion 22 is provided with a plurality of holes 28 for introducing first air from the second passage 32 into the first passage c in revolution, so that the first air of high temperature to be supplied into a first air feed port 12 of the burner body 11 flows into the first passage 31 and second passage 32 through the holes 28 to exhaust from the corresponding opening portions c, d to the outside. A set of large guide blades 33 are provided within the burner external pipe 13 to cause circulation of the first air in the first passage 31. Also a set of small guide blades 34 are provided on the oil nozzle 14 to cause circulation of the second air in the cooling air passage 19, the second air being supplied from a second air feed port 18 of the burner body 11 into the cooling air passage to exhaust from the opening of the outwardly expanded conical opening portion 17 to the outside. Within an oil passage formed by the oil nozzle 14, there is provided a cock 36 of an oil regulating mechanism for adjusting the amount of oil supported from an oil port 15 to deliver to an opening of the oil nozzle 14, said oil regulating mechanism including a rotary handle 37 rotatable in cooperation with the operating knob 29, in a known manner.

Under the above construction of an oil burner, a small amount of the second air having ambient cold temperature, for instance, in an amount of 2 through 20% of the entire supplying air including the first air and second air is fed from the cooling air feed port 18 to the cooling air passage 19 of the second air nozzle 16, while a large amount of the first air preheated to a high temperature, for instance, 92 through 80% of entire supplying air are fed from the combustion air feed port 12 to the first passage 31 and second passage 32 through holes 28. The rotation of the rotary handle 37 is rendered to open the cock 36 of the oil regulating mechanism within the oil passage by a given amount to feed the oil from the oil feed port 15 to the oil nozzle 14, while the rotation of the operating knob 29 is rendered to advance or retreat the first air nozzle 20 by a given amount to feed the first air to the first passage 31 and second passage 32. When the rotary handle 37 is operated in cooperation with the operating knob 29, the opening areas of the opening portions c, d are rendered to open in accordance with the oil exhaust amount flowing through the cock 36 in the oil passage, so that an atomizing operation for oil is performed with the high-temperature preheating first air exhausting from the opening portions c, d at the outside of the oil nozzle 14 to effect the combustion.

In addition, in the present invention, the cooling air normally flows outside the oil nozzle 14 and inside the second air nozzle 16 as described hereinabove to cool and protect the oil nozzle 14 from the high-temperature of first air, and, even if the feed amount of oil into the oil passage 35 is reduced, or cut off when an oil heavy in quality is used, the oil is not carbonized within the oil nozzle 14 so that the nozzle 14 is not blockaded by any means.

Also, since the tip end portion of the first air nozzle 20 is screened with the tip end portion of the second air nozzle 16, the oil is not adhered to the tip end portion of the first air nozzle 20. Since the conical opening portion 17 of the second air nozzle 16 is kept cooled by the cooling air, the attached oil is prevented from being carbonized. In addition, as the conical opening portion 17 and the first air nozzle 20 vary the opening area, the tip end portion of the first air nozzle 20 is formed of in any configuration and not required to be rendered conical in shape, whereby the manufacturing operation is simplified.

As described hereinabove, according to the present invention, the cooling air prevents the temperature of the preheating combustion air from applying influences upon the oil nozzle. The tip end portion of the first air nozzle is protected by the second air nozzle. Even in a case where air of high temperature is used as the preheating combustion air, and heavy and inexpensive oil can be used.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A proportional regulation oil burner of low pressure air type, which comprises:
    a burner body provided with a preheated combustion air feed port for introducing a preheated combustion air thereinto and a restricted tip end frustoconical opening portion for exhausting said introduced preheated combustion air;

an oil nozzle centrally disposed with said burner body for discharging oil including a tip end opening portion;

a cooling air feed nozzle disposed around said oil nozzle and having a tip end outwardly tapering, frusto-conical opening portion forwardly extending beyond a tip opening portion of said oil nozzle; and an oil atomizing air feed nozzle disposed around said cooling air feed nozzle and comprises a base end rotary portion rotatably mounted around a base portion of said cooling air feed nozzle and a tip end nozzle portion connected to said base end rotary portion, and means mounting said atomizing air feed nozzle so as to be slidable along the axial direction of said cooling air feed nozzle due to the rotation of said base end rotary portion, said tip end nozzle portion having a plurality of holes therein for introducing, into a passage formed between said tip end nozzle portion and said cooling air feed nozzle, a portion of the preheated combustion air introduced into the burner body, and a frusto-conical tip opening portion positioned rearwardly of the tip end conical opening portion of the cooling air feed nozzle in a passage formed between the opening portion of said burner body and the opening portion of said cooling air feed nozzle;

whereby both an area of the opening formed between said opening portion of the burner body and the opening portion of the oil atomizing air feed nozzle and an area of the opening formed between the opening portion of the oil atomizing air feed nozzle and the opening portion of the cooling air feed nozzle are respectively varied according to the position of said tip end nozzle portion.

2. A proportional regulation oil burner according to claim 1, wherein said base end rotary portion includes a protruding end surface for mating with a recessed end surface of said tip end nozzle portion for imparting axial motion to said tip end portion as said base end rotary portion is rotated.

3. A proportional regulation oil burner according to claim 1, and further including a rotary handle for imparting rotary motion to said base end rotary portion.

4. A proportional regulation oil burner according to claim 2, and further including means forming a guide pin and a screw guide groove operatively connected between said tip end portion and said oil atomizing air feed nozzle for guiding the axial movement of said tip end portion.

* * * * *